United States Patent [19]

Stogner et al.

[11] Patent Number: 4,527,769
[45] Date of Patent: Jul. 9, 1985

[54] APPARATUS FOR MOVING A CONTROLLED MEMBER TO A PREDETERMINED POSITION

[75] Inventors: Clarence H. Stogner; David J. Koerner, both of Cincinnati, Ohio

[73] Assignee: Xomox Corporation, Cincinnati, Ohio

[21] Appl. No.: 538,663

[22] Filed: Oct. 3, 1983

[51] Int. Cl.³ .......................................... F16K 31/145
[52] U.S. Cl. ........................................ 251/14; 74/25; 74/40; 92/94; 92/129; 92/130 R; 251/58; 251/61.4; 251/229; 251/279
[58] Field of Search .................. 74/25, 40, 89, 42, 44, 74/57; 92/94, 129, 130 R; 251/14, 58, 61.4, 229, 279, 251

[56] References Cited

U.S. PATENT DOCUMENTS

| | | | |
|---|---|---|---|
| 1,629,554 | 5/1927 | Thompson | 251/14 |
| 2,047,458 | 7/1936 | Brewer | 74/40 |
| 2,287,472 | 6/1942 | Eby | 74/44 |
| 2,631,613 | 3/1953 | Bergstrom | 251/279 |
| 2,637,332 | 5/1953 | Langworthy | 251/14 |
| 2,644,485 | 7/1953 | Schwendner | 251/14 |
| 2,733,041 | 1/1956 | Crookston | 251/14 |
| 2,873,611 | 2/1959 | Biermann | 74/40 |
| 2,932,978 | 4/1960 | Newbery | 251/14 |
| 3,028,842 | 4/1962 | Dobrikin et al. | 92/113 |
| 3,144,812 | 8/1964 | Rager et al. | 91/170 R |
| 3,494,077 | 2/1970 | Clarke | 74/42 |
| 3,542,331 | 10/1970 | Canalizo | 251/14 |
| 3,610,568 | 10/1971 | Duwe | 251/58 |
| 3,737,142 | 6/1973 | Boswell et al. | 251/58 |
| 3,801,062 | 4/1974 | Arn et al. | 251/14 |
| 3,929,058 | 12/1975 | Smith | 251/58 |
| 3,952,995 | 4/1976 | Nagumo et al. | 251/232 |
| 4,295,630 | 10/1981 | Card et al. | 251/14 |

Primary Examiner—George L. Walton
Attorney, Agent, or Firm—Frost & Jacobs

[57] ABSTRACT

A fail-safe actuator of the type which permits cycling of a control member during normal operation without encumbrance from a return mechanism includes a link having a slot. A pin secured to a crankshaft coupled to the controlled member is slidably disposed within the slot. The slot permits rotation of the crankshaft within a range defined by the slot length. Upon system failure, a fluid pressure is moved to a predetermined position by a biasing spring to force the crankshaft to a fail-safe position.

22 Claims, 7 Drawing Figures

APPARATUS FOR MOVING A CONTROLLED MEMBER TO A PREDETERMINED POSITION

TECHNICAL FIELD

The present invention relates generally to actuators and is particularly directed to fail-safe actuators of the type which return a controlled member to a predetermined position in response to a system failure. The invention will be specifically disclosed in connection with a spring return actuator which permits movement of the controlled member, independent of and unencumbered by the return spring during normal operation of the controlled member.

BACKGROUND OF THE INVENTION

In many situations, it is desirable to move a controlled member to a predetermined position in response to a system failure. Since this predetermined position is often dictated by safety considerations, actuators which have been developed to achieve this objective are commonly termed "fail-safe" actuators.

Fail-safe actuators are presently employed in a wide variety of situations. For example, such actuators may be used to move a valve or other controlled member to either an open or closed position in response to an electrical or hydraulic failure. Similarly, as a further example, a fail-safe actuator may be used to move a controlled member, such as a valve in a process line for combustible media, to a predetermined position in response to a fire.

Typically, fail-safe actuators rely upon stored energy to return a controlled member to a fail-safe position in response to system failure. The most prevalent energy storage means in contemporary fail-safe actuators is a return spring wherein the spring is arranged to urge the controlled member to the desired fail-safe position. During normal operating conditions, an externally generated force is applied against the return spring to overcome the spring bias. The externally generated force is terminated in response to a sensed system failure, and the stored spring force is then used to return the actuator to the predetermined fail-safe position. Spring return fail-safe actuators are highly advantageous in that the stored energy used to move the controlled member to its fail-safe position is not normally immediately effected by the source of system failure.

An exemplary prior art spring return fail-safe actuator is disclosed in U.S. Pat. No. 3,542,331 to Canalizo. In this disclosed arrangement, a pressurized fluid is applied against a piston to move the piston against the biasing force of a compression spring. The rectilinear movement of the piston is converted into rotary movement to cause a controlled valve member to be rotated about an arc of 90 degrees and to move the valve from a closed position to an open position. When the pressurized fluid pressure against the piston is relieved in response to predetermined conditions or signals, energy stored in the compressed spring is used to move the controlled valve member back to its closed position.

Many applications require the controlled member to be repeatedly moved or cycled during normal operation. Movement of the controlled member, such as cycling the valve of the above described Canalizo arrangement between open and closed positions, has also required movement of the return spring in most prior art arrangements. In addition to introducing wear and increasing the possibility of fatigue failure in the return spring, cycling of the spring also increases the demands placed upon the actuator, since the biasing force of the return spring must be overcome in order to move the controlled member. A further example of a spring return actuator wherein a return spring is cycled with the controlled member during normal operation is disclosed in U.S. Pat. No. 3,051,143 to Nee.

A fail-safe actuator which does not require cycling of the return spring with the controlled member is disclosed in U.S. Pat. No. 4,295,630 to Card et al. In this arrangement, a flexible cable is used to couple a spring biased piston to a rotatable torque transmitting shaft. An end clamp is used to retain one end of the cable in a recessed, radially outwardly open track in an arcuate sector of a yoke, the yoke being attached to the rotatable shaft. The opposite end of the cable is secured to the piston. The piston is spring biased to an extended position by a compression spring. In operation, a pressurized fluid is introduced into the Card et al actuator to move the piston to a retracted position against the bias of the compression spring. When the piston is in this retracted position, the flexible cable is in a slack position which permits cycling of the rotatable shaft (and a controlled member) without the necessity of cycling of the piston and compression spring. When the pressurized fluid is discharged, the compression spring returns the piston to the extended position, bringing the cable into a tautened condition and moving the rotatable shaft and a controlled member to a fail-safe position.

The advantages offered by an arrangement which permits movement of the controlled member during normal operation without the necessity of moving the return spring are significant. However, the arrangement utilized in the above identified Card et al disclosure has several shortcomings, particularly in high torque applications. As the size of a cable increases to meet increased torque requirements of a valve, for example, the flexibility of the cable diminishes. Not only does the cable become difficult to bend about an arcuate yoke, the cable also tends to transmit force to the piston instead of flexing as the controlled member is moved during normal operation. Additionally, it is difficult to reliably secure an end stop onto a cable, or otherwise reliably secure the cable to the yoke or the piston, to withstand the tension generated in high torque applications.

Furthermore, actuators of the type discussed above typically have used springs having linear force-displacement characteristics. Accordingly, the return force exerted by the spring varies linearly throughout the return stroke with the minimum spring force corresponding to the return or fail-safe position of the controlled member. In many situations, however, the force requirements of the controlled member varies non-linearly and does not match the spring force-displacement characteristics. For example, a plug valve is generally rotated approximately 90 degrees between fully open and fully closed positions with maximum torque requirements occuring at both ends of the rotational stroke. If a linear spring is used to return a plug valve from a fully open to a fully closed position (or vice versa), the maximum spring force would match the maximum torque requirements only at the beginning of the return stroke (as the valve begins to move from the fully open position to a closed position). At the opposite end of the return stroke (as the valve is moved through the final phases of its rotation to the fully closed position), the return spring force is at a minimum while the torque requirements of the valve once again reach a relative maximum level. Moreover, many applications encounter high dynamic forces wherein the maximum torque (or linear force) requirements are encountered intermediate the end positions of the return stroke. As a consequence of the mismatching of the spring force output and the valve torque requirements, designers have been relegated to oversizing the return spring to insure adequate spring force throughout the entire range of valve or other controlled member movement. The need to oversize the return spring is particularly disadvantageous when the spring must be moved along with the controlled member during normal operation.

SUMMARY OF THE INVENTION

Accordingly, it is a primary object of the present invention to provide a highly reliable fail-safe actuator for returning a controlled member to a predetermined position in response to a system failure while allowing independent movement of the controlled member during normal operation.

It is another object of the present invention to provide an actuator capable of applying a high force to a controlled member to move the controlled member to a fail-safe position in response to a system failure while permitting independent movement of the controlled member during normal operation, unencumbered by the fail-safe movement force.

It is yet another object of the present invention to provide an actuator for moving a controlled member to a fail-safe position through a range of movement wherein the moving forces at the beginning and end of the range of movement are relatively low as compared to the intermediate positions of the movement range.

Yet another object of the present invention is to provide a spring return fail-safe actuator having a non-linear torque output for matching the non-linear torque requirements of a controlled member.

A still further object of the present invention is to provide an actuator for returning a controlled member with high dynamic force requirements to a predetermined position.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fail-safe actuator is provided for returning a controlled member to a predetermined position in response to a system failure. The actuator includes a housing with a reciprocally movable member movable between first and second positions within the housing. The reciprocally movable member is biased toward the first position and is selectively movable toward the second position against the bias. A rigid link secured to the reciprocally movable member has a slot for accommodating movement of a pin of a force transmitting element when the reciprocally movable member is in the second position during normal operation. When the reciprocally movable member is moved to the first position in response to a system failure, the link is operative to move the force transmitting element to a predetermined position through contact with the pin. The force transmitting element is adapted to transmit force to a controlled member.

The reciprocally movable member is preferably a fluid pressure member, and the housing preferably includes means for introducing and exhausting a pressurized fluid to move the fluid pressure member.

In accordance to a further aspect of the invention, at least one spring is used to bias the fluid pressure member to the first position.

According to a further aspect of the invention, a force transmitting element is rotatable about a rotational axis.

In yet another aspect of the invention, the fluid pressure member is reciprocally movable along a rectilinear path, and the rotational axis of the force transmitting element is substantially perpendicular to the rectilinear path.

In a still further aspect of the invention, the link is pivotally secured to at least one radially extending lever of the force transmitting element for applying a torque to rotate the force transmitting element about the rotational axis.

The force transmitting element preferably includes a rotational shaft with at least one radially extending lever. The pin is preferably secured to the lever or levers and disposed in the slot.

In accordance to yet another aspect of the invention, the slot is dimensioned to permit movement of the pin within the slot about an arcuate path of approximately 90 degrees when the fluid pressure member is in the second position.

According to a still further aspect of the invention, a pair of lever arms extend radially outward from the rotational shaft of the force transmitting element in spaced parallel relationship, and the pin extends between the pair of lever arms.

In yet another aspect of the invention, the force transmitting element is offset from its rotational axis in the area between the lever arms to avoid interference with the link as the fluid pressure member is moved between the first and second positions.

In a still further and specific aspect of the invention, the fluid pressure member includes a diaphragm and a diaphragm support movable with the diaphragm.

In yet another aspect of the invention, a rod has one end rigidly secured to the fluid pressure member with the opposite end containing a clevis for interconnecting the link with the fluid pressure member.

In still another aspect of the invention, a guideway for guiding rectilinear movement of the clevis rod is provided.

In a still further aspect of the invention, the housing is divided into first and second internal chambers by the diaphragm. The first internal chamber has a port for introducing and exhausting pressurized fluid for selectively moving the reciprocally movable member from the first to the second positions.

In yet another aspect of the invention, at least one spring is a compression spring disposed in the second internal chamber urging the diaphragm against the force generated by pressurized fluid in the first chamber.

In accordance with another aspect of the invention, a spring retainer, including an annular centering ring for aligning the compression spring is disposed in the second chamber. A guideway for directing movement of the clevis is concentrically disposed within the centering ring.

According to another aspect of the invention, the force transmitting element is coupled to a valve for transmitting a torque to rotate the valve.

In yet a further aspect of the invention, the pin travels about an arcuate path as the force transmitting element is rotated, and the link transmits a biasing force of the spring along a line of action passing through the pin. The perpendicular distance between the rotational axis and the line of action is coordinated with the force displacement characteristics of the spring to produce a maximum spring generated torque intermediate the first and second positions of the fluid pressure member. In a still further and specific aspect of the invention, the controlled member is a valve member rotatable by torque transmitted by the rotational shaft.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
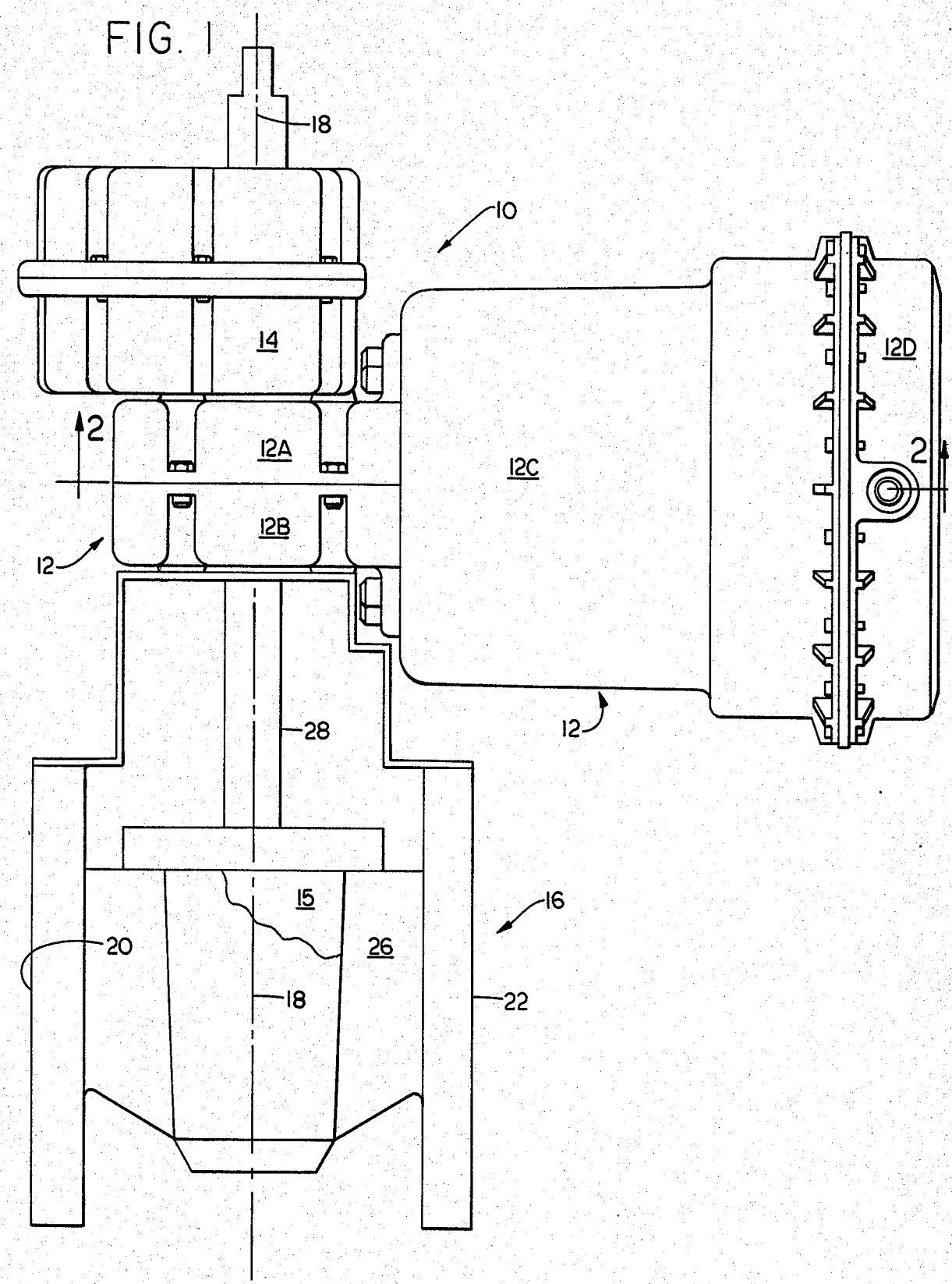
FIG. 1 is a side elevational view of a fail-safe actuator in accordance with the present invention in cooperative relationship with a valve for moving the valve to a predetermined position in response to a system failure.

Referring now to the drawings, FIG. 1 shows a fail-safe system generally designated by the numeral 10 constructed in accordance to the present invention. The system 10 includes a fail-safe actuator 12 interposed between a cycling actuator 14 and controlled member 15, which member 15 must be moved to a predetermined position in response to a system failure. The controlled member 15 illustrated in FIG. 1 is a conventional tapered valve plug rotatably disposed within a valve generally identified by the number 16. The plug 15 is rotatable about a vertical (as illustrated) axis 18 to selectively align a non-illustrated through passageway in the plug 15 into registry with an inlet 20 and an outlet 22 of a valve body 26. The plug 15 is moved between fully open and fully closed positions by 90 degrees rotation of the valve plug 15 with respect to the valve body 26.

The cycling actuator 14 is illustrated as a conventional vane type actuator and is operative in response to the introduction and exhaustion of a fluid to rotate a shaft 28 through the actuator 12 in a manner more fully described hereinafter. The shaft 28 is, in turn, operative to rotate the plug 15 of valve 16 with respect to the valve body 26. The cycling actuator 14 is rigidly interconnected to the valve plug 15 and operative to limit rotation thereof to approximately 90 degrees.

The fail-safe actuator 12 includes split housing components 12a and 12b, both of which are secured to an adjoining housing component 12c of cylindrical configuration. An end cap 12d is removably secured to the housing component 12c to provide access to the cylindrical housing portion.

Figure 2:
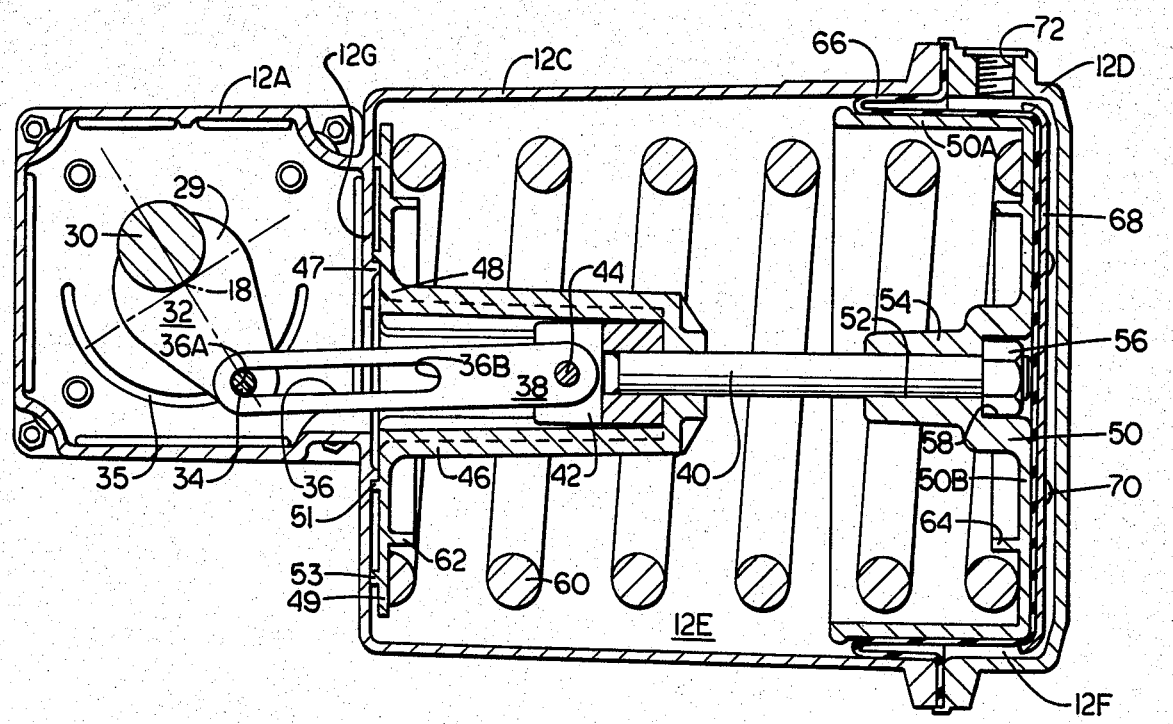
FIG. 2 is a cross-sectional view taken along line 2—2 of FIG. 1 depicting the actuator in a fail-safe position.
Figure 3:
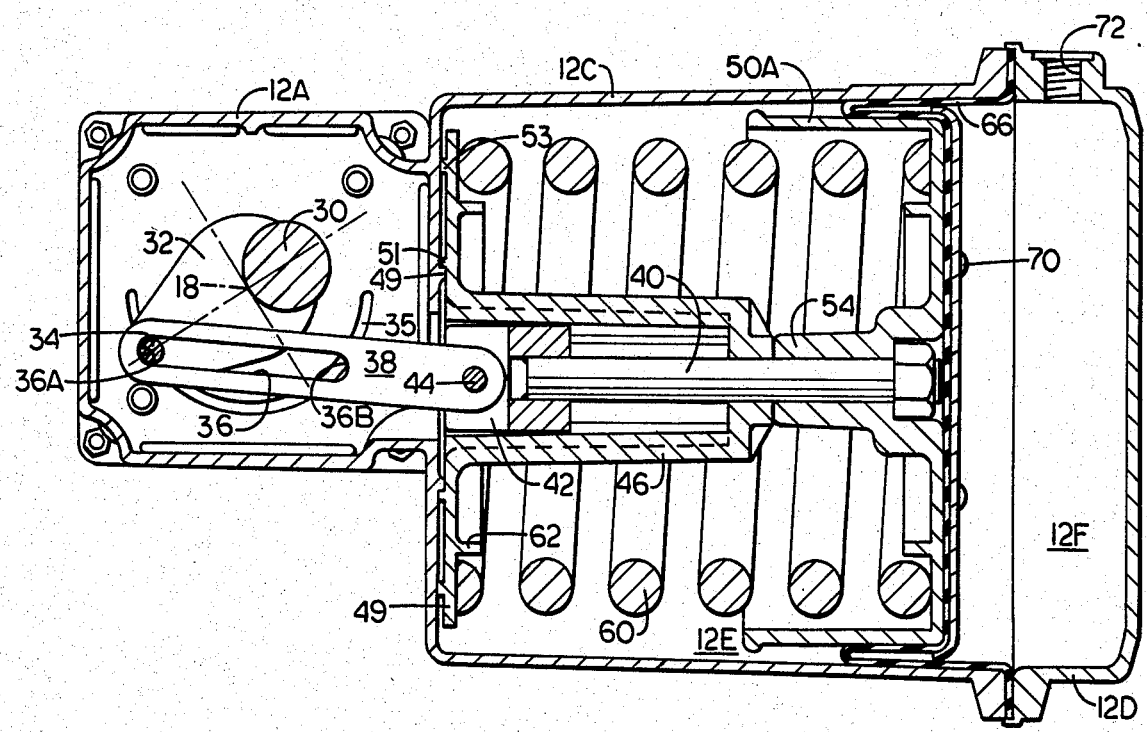
FIG. 3 is a cross-sectional view similar to FIG. 2 but depicting the actuator in a normal operating position permitting rotation of the valve without encumbrance by the fail-safe return mechanism.
Figure 4:
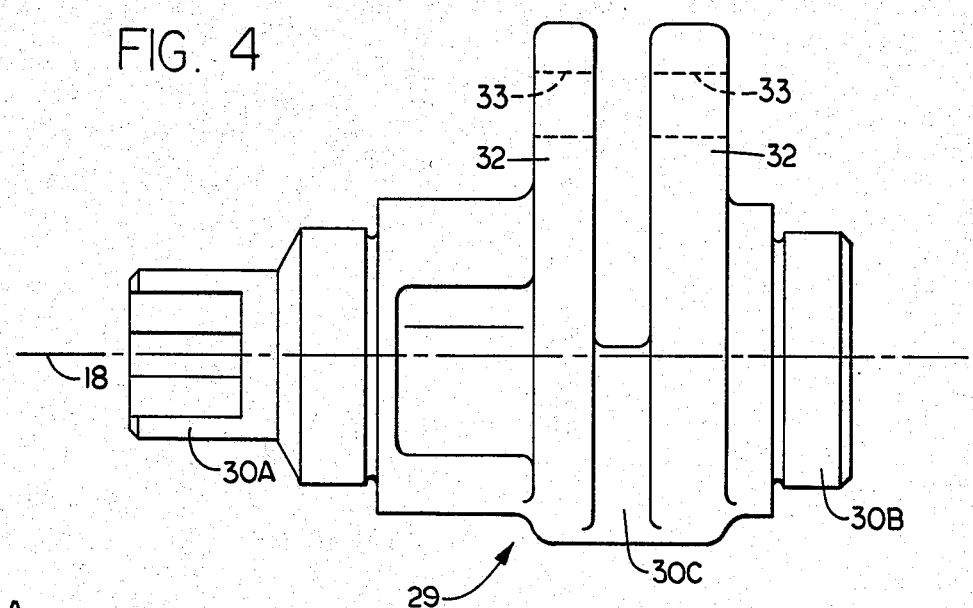
FIG. 4 is a side elevational view of a crankshaft used in the actuator of FIGS. 1-3 for transmitting rotary force to the valve.

As illustrated in FIGS. 2 and 3, a force transmitting element in the form of a crankshaft 29 is rotatably journalled in bearings (not shown) within the housing components 12a and 12b of the actuator 12. The crankshaft 29 includes a spindle 30 rotatable about the axis 18 and a pair of crankarms 32 (only one of which is shown in FIGS. 2 and 3, both crankarms are shown in FIG. 4) extending radially outward from the spindle 30 in spaced parallel relationship. A pin 34 extends between two aligned apertures 33 (FIG. 4) in the crankarms 32 and through a slot 36 in a link 38, the slot 36 being proximal to one end of the link 38. The pin 34 extends in a direction parallel to but offset from the rotational axis 18 so that the link 38 has a line of action non-coincident with the axis 18 for applying a torque to the crankshaft 29. Arcuate guidetracks 35 extend inwardly from the interior surfaces of housing components 12a, 12b adjacent to the exterior sides of the crankarms 32 to secure the pin 34 in the aligned apertures 33 as the spindle 30 is rotated about axis 18.

The link 38 extends from the split housing components 12a, 12b into the adjoining cylindrical housing component 12c where the opposite end of the link 38 (opposite the slot 36) is pivotally secured to a rod 40 by a pin 44 of a clevis 42 rigidly affixed to the rod 40. The clevis 42 is slidably disposed within a cylindrical extension 46 of a spring retainer base 48. The spring retainer base 48 also includes a relatively thin radially extending base plate 49 reinforced by a pair of concentric annular reinforcing ribs, inner rib 51 and outer rib 53. Inner rib 51 also functions as a centering ring as its interior surface engages the outer surface of an annular boss 47 extending from an axial endwall 12g of the cylindrical housing portion, the axial endwall 12g being opposite to the end cap 12d. The interior walls of the cylindrical extension 46 provide a guideway to direct sliding rectilinear movement of the clevis 42.

The end of rod 40 opposite the clevis 42 is secured to a reciprocally movable fluid pressure member specifically illustrated as a cup shaped diaphragm support 50, including axially extending sidewalls 50a and a radially extending end surface 50b. The rod 40 extends through a bore 52 of an extended boss 54 centrally disposed on the radially extending end surface 50b of the diaphragm support 50. A nut 56, having a diametral dimension greater than the bore 52, is threadably secured to the end of rod 40 opposite the clevis 42 in a counterbore 58 for transmitting force to the diaphragm support 50 whenever the rod 40 is pulled by the link 38.

The diaphragm support 50 is biased away from the crankshaft 28 by a compression spring 60 extending between the diaphragm support member 50 and the spring retainer base 48. The spring 60 is disposed concentrically about the cylindrical extension 46 and boss 54 and concentrically within the sidewall 58a of the cup shaped diaphragm support member 50. Centering rings 62 and 64 on the spring retainer base plate 49 and diaphragm support end surface 50b respectively serve to center the spring 60 and maintain this concentric relationship.

A diaphragm 66 is compressingly and sealingly interposed between the cylindrical housing component 12c and the end cap 12d to divide the cylindrically shaped housing portion into two variable volume chambers 12e and 12f. Diaphragm 66 is held against the end plate 50b of diaphragm support 50 by a retainer 68. The retainer 68 illustrated in FIGS. 2 and 3 covers the entire radially extending end surface 50b and partially covers the axial sidewalls 50a. A plurality of screws 70 extend through the retainer 68 and diaphragm 66 into the diaphragm support 50 to secure the diaphragm 66 relative to the diaphragm support 50. An inlet port 72 extends through an axial sidewall of end cap 12d to selectively introduce and exhaust pressurized fluid into and out of the variable volume chamber 12f.

As seen in FIG. 4, spindle 30 of crankshaft 28 is offset from the rotational axis 18 in the area 30c between the crankarms 32. This offsetting of the spindle 30 provides clearance for the link 38 as the spindle 30 is rotated between the positions depicted in FIGS. 2 and 3 and permits compact design of the actuator 12. The end 30a of spindle 30 rigidly interconnects with the shaft 28 to rotate the controlled member 16, and the end 30b rigidly interconnects with vane actuator 14 to transmit torque between that actuator 14 and the controlled member 16.

As noted above, the crankshaft 28 is rigidly coupled to both the vane type actuator 14 and the valve plug 15 of the illustrated embodiment. Consequently, rotational displacement of the spindle 30 directly corresponds to the rotational displacement of the valve plug 15. For purposes of the present description, the rotational position of spindle 30 shown in FIG. 2 will be described as corresponding to the fully closed or fail-safe position, and the rotational position of FIG. 3 will be described as the fully open position. It should be clear, however, that in many situations it may be desirable to move a valve (or other controlled member) to a fully open position in response to system failure.

As apparent from both FIG. 2 and FIG. 3, the outboard end 36a of the elongated slot 36 eliminates the clockwise rotation of spindle 30 by the engagement of pin 34 by the crankarm 32 and link 38. When a pressurized fluid having sufficient pressure to overcome the force of compression spring 60 is introduced into the variable volume chamber 12f through the inlet port 72 in end cap 12d, the pressure acts upon the diaphragm 66 to move the diaphragm 66 and diaphragm support 50 rectilinearly against the bias of spring 60 (leftwardly in FIGS. 2 and 3). As shown in FIG. 3, this movement of the diaphragm support 50 is substantially perpendicular to the rotational axis 18 and limited by the engagement of boss 54 with the cylindrical spring retainer extension 46. However, the resulting movement of the clevis 42 is sufficient to move the link 38 and the clockwise limiting position of spindle 30 approximately 90 degrees (clockwise) to a position (as shown in FIG. 3) permitting the valve 16 to be moved to the fully open position.

Significantly, the inboard end 36b of the slot 36 is displaced from the outboard end 36a by a dimension sufficient to permit the spindle 30 to rotate approximately 90 degrees in the clockwise direction when the link 38 is in the normal operating position depicted in FIG. 3. Thus, when the pressurized fluid in the variable volume chamber 12f has moved the link 38 to the limiting position of FIG. 3, the spindle 30 may be freely moved throughout the entire 90 degree range between the positions illustrated in FIGS. 2 and 3 without movement of the diaphragm support 50 or the compression spring 60. Thus, when the actuator 12 is in the normal operating position (FIG. 3), the vane type actuator may be used to cycle the valve 16 without the encumbrance of the fail-safe return mechanism.

However, if the pressurized fluid is exhausted from the variable volume chamber 12f in response to a system failure, the compression spring 60 then forces the diaphragm support 50 to the fail-safe position of FIG. 2. This movement of the diaphragm support 50 is transmitted through rod 40 and clevis 42 to force the link 38 and spindle 30 to the limiting position of FIG. 2, returning the valve 16 to the fully closed or fail-safe position. Significantly, this forced return of the valve 16 to the fail-safe position is advantageously achieved through a rigid link having a highly secured connection to the spindle 30 capable of reliably transmitting substantial force.

Conventionally, plug valves have high pressure ribs about the inlet and outlet in pressure sealing contact with the rotary plug member. Consequently, such valves have non-linear high torque requirements which are maximized as they approach both the fully open and fully closed positions. In the illustrated embodiment, valve plug 15 would have a relatively high torque requirement at both the beginning and ending of its 90 degrees rotational range.

Typically, prior art spring return fail-safe actuators apply a linearly varying force to return a controlled member to a fail-safe position. Thus, if the controlled member is a valve plug, the maximum return force generated by a typical prior art actuator would match the maximum torque requirements of the valve only at the beginning of the return stroke. At the opposite end of the 90 degrees rotation, the return force generated by such an actuator would be at a minimum as the torque requirements for the valve plug once again reach a relative maximum. With such mismatching of the spring generated return force to the force requirements of the plug valve, it was necessary to drastically oversupply force at one end of the return stroke to insure an adequate force to meet the relatively high torque requirements at the opposite end.

Furthermore, some controlled members have high dynamic torque requirements. For example, the maximum torque experienced by a butterfly valve in a modulating application occurs when the butterfly valve experiences a torque reversal at approximately 70 percent opening. The dynamic torque requiremnts at this location exceed even the relatively high torque requirements for seating the butterfly valve. Thus, if a linearly varying actuator force, such as generated by the prior art actuators described above, is used to move a butterfly valve to an open fail-safe position, the maximum torque requirements of the butterfly valve occurs as the generated force is at a very low level. Moreover, if such an actuator is used to move a butterfly valve to a fail-safe closed position, the substantial closing force requirements occur as the actuator generated force reaches a minimum.

In contrast, the actuator of the present invention may be used to generate a non-linear return force with the maximum torque being produced intermediate the end points of the range of movement. In the illustrated embodiment, substantially equal torques are generated at opposite ends of the return stroke. Thus, it is not necessary to overdesign the return force at one end of the return stroke to insure adequate force at the opposite end to meet the requirements of applications such as the plug valve and butterfly discussed above. Instead, the maximum return force occurs at an intermediate position between the end points of the stroke. The application of maximum forces at this intermediate position proves advantageous not only for meeting requirements such as the butterfly valve, but also in minimizing the potential for damaging the controlled member 15 as the pressurized fluid is initially released from the variable volume chamber 12f. The application of the maximum return force generated by a heavy duty actuator against a valve which is frozen in a fully open or fully closed position or otherwise obstructed from movement, for example, may damage the valve.

Figure 5A:
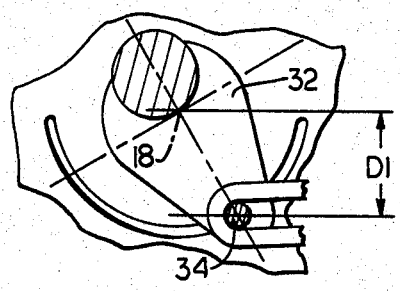
FIG. 5a is a fragmentary cross-sectional view, partially in cross-section, of the crankshaft corresponding to the actuator position of FIG. 2 depicting the moment arm for rotating the crankshaft at one end of the actuator stroke.
Figure 5B:
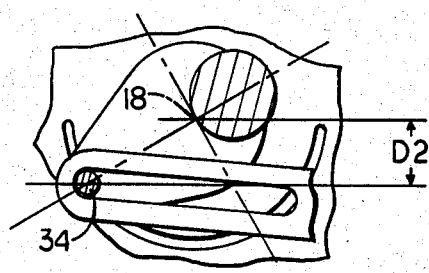
FIG. 5b is a fragmentary cross-sectional view, partially in cross-section, of the crankshaft corresponding to the actuator position of FIG. 3 depicting the moment arm for rotating the crankshaft at the opposite end of the actuator stroke.
Figure 6:
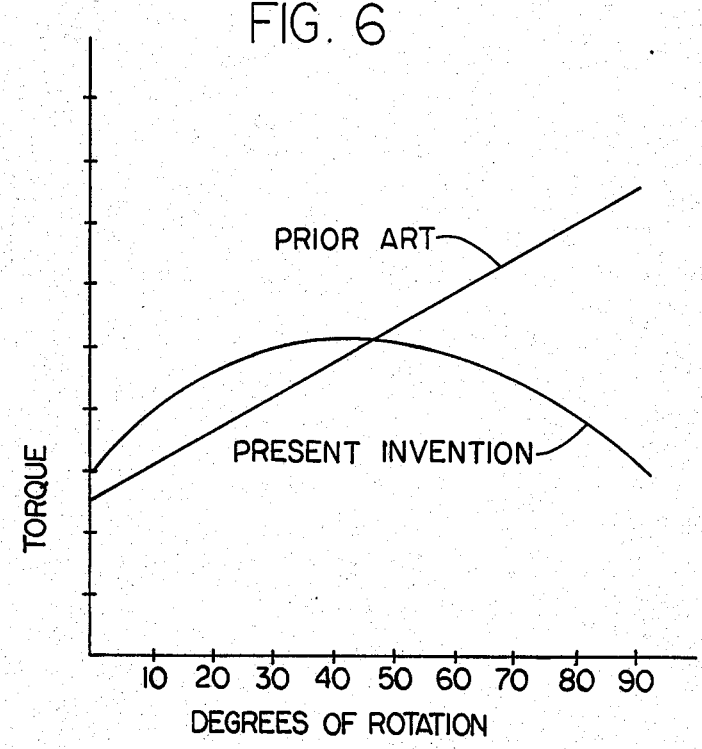
FIG. 6 is a graphical comparison of the relationship between spring return forces and rotational displacement in the present invention and typical prior art spring return fail-safe actuators.

The non-linear force is achieved in the preferred embodiment by coordinating the perpendicular distance from the pin 34 (to which the return force is applied to crankshaft 29 by the link 38) and the rotational axis 18 of spindle 30 with the spring generated force. Compression spring 60 applies a linearly varying force against the diaphragm support 50. However, the torque applied to spindle 30 is a function of the product of the spring generated force and the perpendicular distance at which the force is applied to the spindle 30. As most clearly shown in FIGS. 5a and 5b, the perpendicular distance D1 between the pin 34 and the axis 18 at the closed valve position of FIG. 5 (which corresponds to the fully closed position of FIG. 2) is greater than the perpendicular distance D2 depicted in FIG. 5b (which corresponds to the fully open position of FIG. 3). However, the force generated by the compression spring 60 is greater when the spindle 30 is in the FIG. 5b position than when the spindle 30 is in the FIG. 5a position. The perpendicular distances D1, D2 are coordinated so that the product of the perpendicular distance D1 with the corresponding spring force at the fully closed position equals the product of the distance D2 with the corresponding spring force for the fully open position. The illustrated arrangement produces a maximum torque at approximately 70 percent closing and closely matches the torque requirements for a modulating butterfly valve, as described above. The torque curve generated by the illustrated actuator is depicted and compared to a torque curve developed by a typical prior art spring return actuator in FIG. 6.

The actuator arrangement of the present invention also facilitates retrofitting of existing actuated systems in the field. For example, a spring return actuator normally has a substantially larger size than a double acting actuator generating equivalent force. As a consequence, when double acting actuators are replaced with spring return actuators, it is necessary to also change the mounting bracket, compensators, etc. in order to accommodate an equivalent spring return actuator.

However, in applicant's arrangement, the cycling actuator 14 is not required to move the spring 60, and it is unnecessary to oversize the cycling actuator 14 for satisfactory operation. Thus, a double acting actuator system may be retrofitted to a spring return system of the same approximate physical size, and it is not necessary to change mounting brackets and the like.

In summary, numerous benefits have been described which result from employing the concepts of the invention. The actuator provides a highly reliable linkage for returning a controlled member to a predetermined fail-safe position. Further, the actuator permits movement of the controlled member without any encumbrance from the return mechanism during normal operation and is capable of transmitting substantial return forces. The actuator also generates a non-linear return force especially adapted for use with controlled members, such as valves, having non-linear force requirements. The return force generated by the actuator is maximized at intermediate positions of the return stroke to accommodate controlled members having high dynamic force requirements. In one specific aspect of the invention, the return force generated by the actuator is approximately equal at opposite ends of the return stroke. Furthermore, in field retrofitting is greatly facilitated and double acting actuators may be readily replaced with applicant's spring return actuator without the necessity of changing mounting brackets.

The foregoing description of a preferred embodiment of the invention has been presented for purposes of illustration and description. It is not intended to be exhaustive or to limit the invention to the precise for disclosed. Obvious modifications or variations are possible in light of the above teachings. For example, it is clear that the controlled member could be a damper or any of many other well known elements. It is also clear that it is not necessary to use the invention with quarter turn (90°) devices such as disclosed in the illustrated embodiment. It is also readily apparent that the invention could be constructed as a multiple barrel actuator having multiple angularly spaced lever portions extending from the rotational shaft with separated slotted links associated with each lever portion and extending into separate barrels. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:
1. A fail-safe actuator, comprising:
   (a) a housing;

(b) a reciprocally movable member movable between first and second positions within said housing;
(c) means for biasing said reciprocally movable member toward said first position;
(d) means for selectively moving the reciprocally movable member toward said second position against said biasing means;
(e) a link secured relative to said reciprocally movable member for common movement therewith, said link having a slot; and
(f) a force transmitting element moveable throughout a range adapted for transmitting force to a controlled member, said force transmitting element including a pin movably disposed within the slot of the link, the link being operative to move the force transmitting element to a predetermined position within said movement range through contact with the pin when the reciprocally movable member is in the first position while permitting movement of the pin within the slot when the reciprocally movable member is in the second position the movement of the pin within the slot permitting the force transmitting element to be moved throughout said movement range independently of movement of the reciprocally movable member whenever the reciprocally movable member is in the second position.

2. A fail-safe actuator as recited in claim 1 wherein the reciprocally movable member is a fluid pressure member and wherein the means for selectively moving the reciprocally movable member includes means for introducing and exhausting a pressurized fluid into and out of the housing.

3. A fail-safe actuator as recited in claim 2 wherein said biasing means includes at least one spring.

4. A fail-safe actuator as recited in claim 3 wherein the force transmitting element is rotatable about a rotational axis.

5. A fail-safe actuator as recited in claim 4 wherein the fluid pressure member is reciprocally movable along a rectilinear path, and the rotational axis of the force transmitting element is substantially perpendicular to the rectilinear path.

6. A fail-safe actuator as recited in claim 5 wherein the link is pivotally secured to the force transmitting element with a line of action non-coincident with the rotational axis for applying a torque to rotate the force transmitting element.

7. A fail-safe actuator as recited in claim 6 wherein the force transmitting element includes a rotational shaft with at least one radially extending lever portion, said pin being secured to at least one said lever portion.

8. A fail-safe actuator as recited in claim 7 wherein the elongated slot is dimensioned to permit movement of said pin within said slot about an arcuate path of approximately 90 degrees when the fluid pressure member is in the second position.

9. A fail-safe actuator as recited in claim 7 wherein a pair of lever portions extend radially outward from the rotational shaft of the force transmitting element in spaced parallel relationship, and said pin extends between the pair of lever portions.

10. A fail-safe actuator as recited in claim 9 wherein the rotational shaft is offset from the rotational axis in the area between the lever portions to avoid interference with said link as the fluid pressure member is moved between the first and second positions.

11. A fail-safe actuator as recited in claim 6 wherein said fluid pressure member includes a diaphragm and a diaphragm support movable with said diaphragm.

12. A fail-safe actuator as recited in claim 6 further including a clevis rod, one end of the clevis rod being rigidly secured to said fluid pressure member with the opposite end including a clevis for interconnecting said link to said fluid pressure member.

13. A fail-safe actuator as recited in claim 12 including a guideway for guiding rectilinear movement of the clevis rod.

14. A fail-safe actuator as recited in claim 11 wherein said housing is divided into first and second internal chambers by said diaphragm, the first internal chamber having a port for introducing an exhausting pressurized fluid.

15. A fail-safe actuator as recited in claim 14 wherein the biasing means includes a compression spring disposed in the second internal chamber, said compression spring urging the diaphragm against force generated by pressurized fluid in the first chamber.

16. A fail-safe actuator as recited in claim 15 further including a spring retainer disposed in said second chamber, said spring retainer including an annular centering ring for aligning the compression spring and a guideway for directing movement of the clevis, said guideway being concentrically disposed within the centering ring.

17. A fail-safe actuator as recited in claim 6 further including a valve member, said force transmitting element being coupled to said valve member for transmitting a torque to rotate the valve member.

18. A fail-safe actuator as recited in claim 6 wherein the pin travels about an arcuate path as the force transmitting element is rotated and wherein the link transmits the biasing force of the spring along a line of action passing through said pin, the perpendicular distance between the rotational axis and the line of action being coordinated with the force displacement characteristics of the spring to produce a maximum spring generated torque intermediate the first and second positions of the fluid pressure member.

19. A fail-safe actuator as recited in claim 18 wherein the perpendicular distance between the rotational axis and the line of action is coordinated with the force displacement characteristics of the spring to produce approximately equal spring generated torques at the first and second positions of the fluid pressure member.

20. An actuator comprising:
(a) a housing;
(b) a fluid pressure member reciprocally movable between first and second positions along a rectilinear path within said housing;
(c) a spring having linear force-displacement characteristics and operative to bias said fluid pressure member toward said first rectilinear position, said spring being displaced by said fluid pressure member as said fluid pressure member is moved toward said second rectilinear position;
(d) means for introducing and exhausting a pressurized fluid into and out of said housing said fluid pressure member being selectively moved toward the second rectilinear position against the bias of said spring upon introduction of said pressurized fluid, said spring being operative to return said fluid pressure member to said first rectilinear position upon exhausting of said pressurized fluid from said housing;

(e) a shaft rotatable between first and second rotatable positions about a rotational axis, said shaft being adapted for transmitting torque to a controlled member;
(f) a crank arm rigidly secured to said shaft and rotatable therewith, said crank arm including a pin; and
(g) a link pivotally attached relative to both said fluid pressure member and said rotatable shaft to transmit the biasing force of the spring along a line of action, said link having a slot for receiving said pin with said pin being movable within said slot, said link being operative to move the crank arm and the shaft to a predetermined position through contact with the pin when said fluid pressure member is in its first position while permitting rotation of the crank arm and the shaft between the first and second rotatable positions independently of movement of the pressure member whenever said fluid pressure member is in said second rectilinear position, the link-shaft attachment being offset relative to the rotational axis so that the link-shaft attachment travels along an arcuate path as the shaft is rotated between the first and second angular positions, the perpendicular distance between the rotational axis and the line of action being coordinated with the force displacement characteristics of the spring so as to produce a maximum spring generated torque intermediate the first and second rotational positions of the shaft.

21. An actuator as recited in claim 20 wherein the perpendicular distance between the rotational axis and the line of action is coordinated with the force displacement characteristics of the spring so as to produce approximately equal spring generated torques at the first and second rotational positions of the shaft.

22. An actuator as recited in claim 20 wherein the controlled member is a valve member rotatable by torque transmitted by the rotatable shaft.

* * * * *